United States Patent [19]

Horikawa et al.

[11] Patent Number: 4,884,259
[45] Date of Patent: Nov. 28, 1989

[54] OPTICAL MEMORY DISK AND TRACK ACCESS THEREFOR

[75] Inventors: Hiroshi Horikawa; Yoshio Kudo; Daigo Ezuka; Takashi Shoji, all of Kaisei, Japan

[73] Assignee: Fuji Photo Film Co., Ltd., Japan

[21] Appl. No.: 770,416

[22] Filed: Aug. 28, 1985

[30] Foreign Application Priority Data

Aug. 28, 1984 [JP] Japan .................. 59-179076
Aug. 31, 1984 [JP] Japan .................. 59-180311
Oct. 3, 1984 [JP] Japan .................. 59-206292

[51] Int. Cl.[4] .................................. G11B 17/22
[52] U.S. Cl. ........................ 369/32; 369/44; 369/46
[58] Field of Search ............... 369/32, 43, 44, 50; 358/342; 360/103, 78, 39.1, 135

[56] References Cited

U.S. PATENT DOCUMENTS

| 3,701,130 | 10/1972 | Ault ........................... 360/78 X |
| 4,000,510 | 12/1976 | Cheney et al. ............ 360/33.1 X |
| 4,016,603 | 4/1977 | Ottesen ...................... 360/135 |
| 4,087,842 | 5/1978 | Manly ......................... 360/77 |
| 4,094,013 | 6/1978 | Hill et al. .................... 369/32 X |
| 4,106,058 | 8/1978 | Romeas et al. ............ 369/32 |
| 4,142,209 | 2/1979 | Hedlund et al. ........... 358/342 |
| 4,504,873 | 3/1985 | Bandy et al. ............... 360/63 |
| 4,535,439 | 8/1985 | Satoh et al. ................ 369/32 X |
| 4,556,966 | 12/1985 | Bricot et al. ............... 369/50 X |

FOREIGN PATENT DOCUMENTS

| 0089263 | 9/1983 | European Pat. Off. |
| 2636183 | 2/1977 | Fed. Rep. of Germany |
| WO/8403583 | 9/1984 | World Int. Prop. O. |

Primary Examiner—Aristotelis M. Psitos
Attorney, Agent, or Firm—Pasquale A. Razzano

[57] ABSTRACT

An optical memory disk has a recording layer which is disposed on one surface of a plain circular support base and has a plurality of radially spaced data tracks for storing data items therein, the data tracks being grouped into a number of data track groups. Each of the tracks is divided into a plurality of angularly consecutive sectors bearing a plurality of angularly equally spaced sector marks, respectively, the sector marks on the tracks of each of the data track groups being located in angularly different positions, respectively. There are also disclosed a method of and a system for rapidly and reliably accessing a desired target track among the data tracks on the optical memory disk.

2 Claims, 10 Drawing Sheets

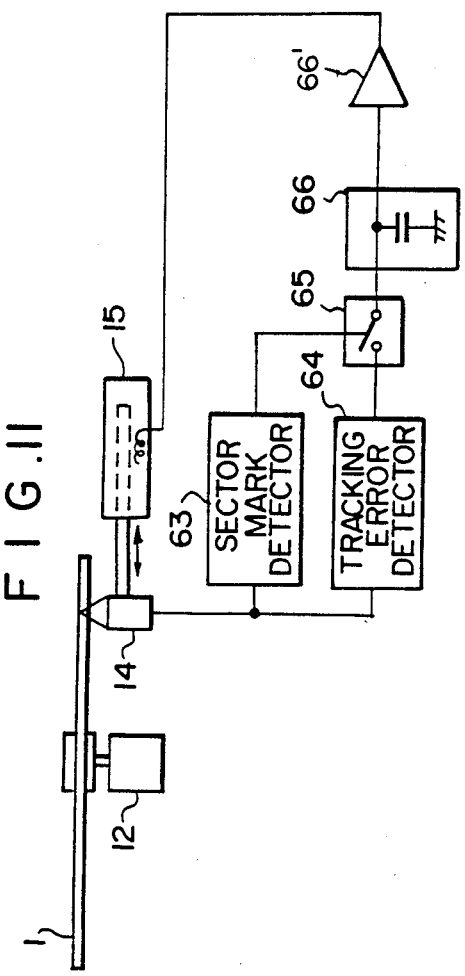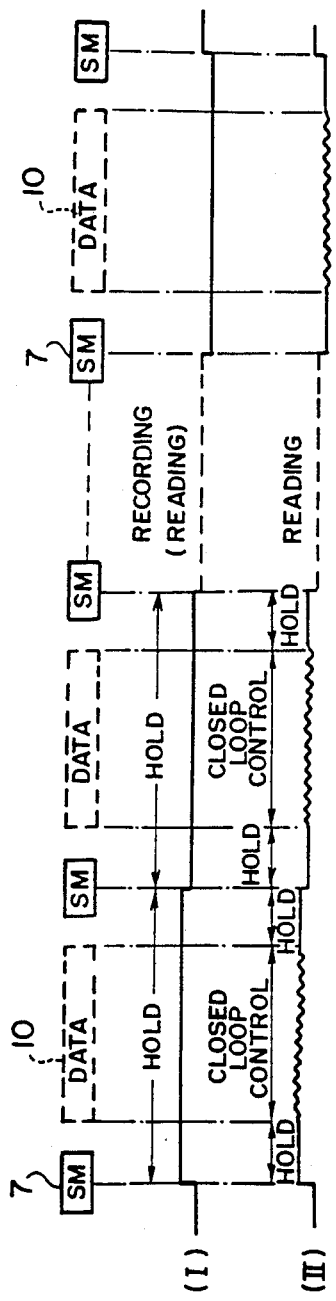

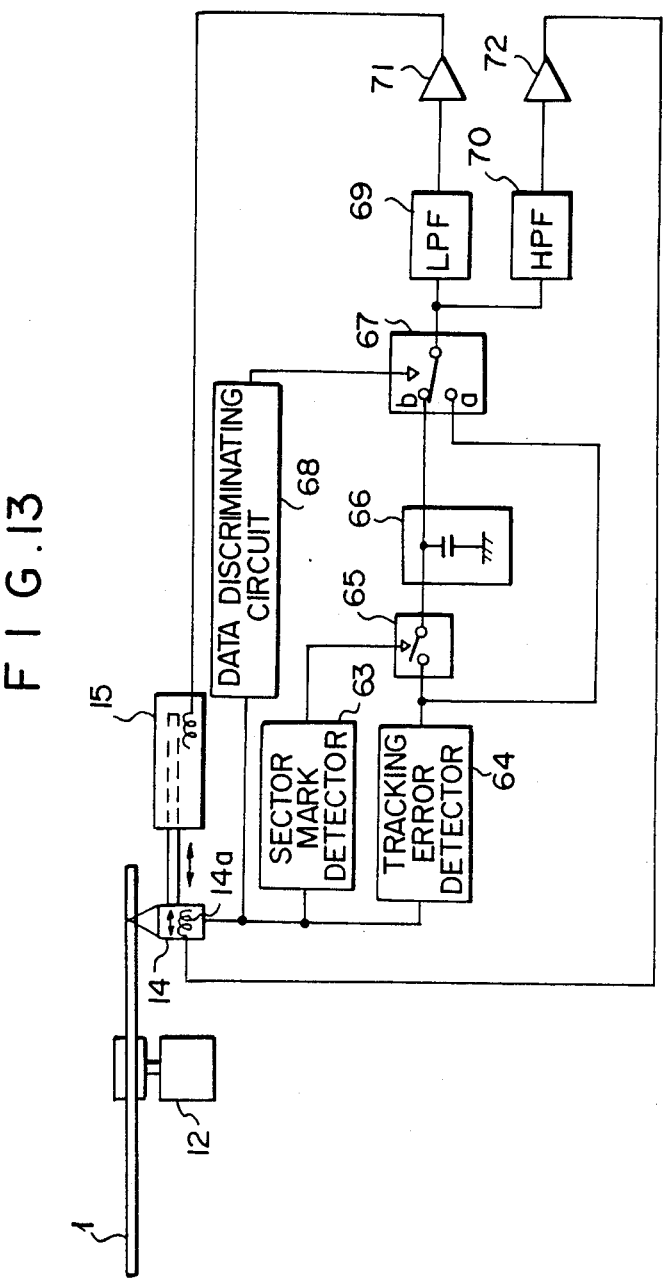
F I G. 13

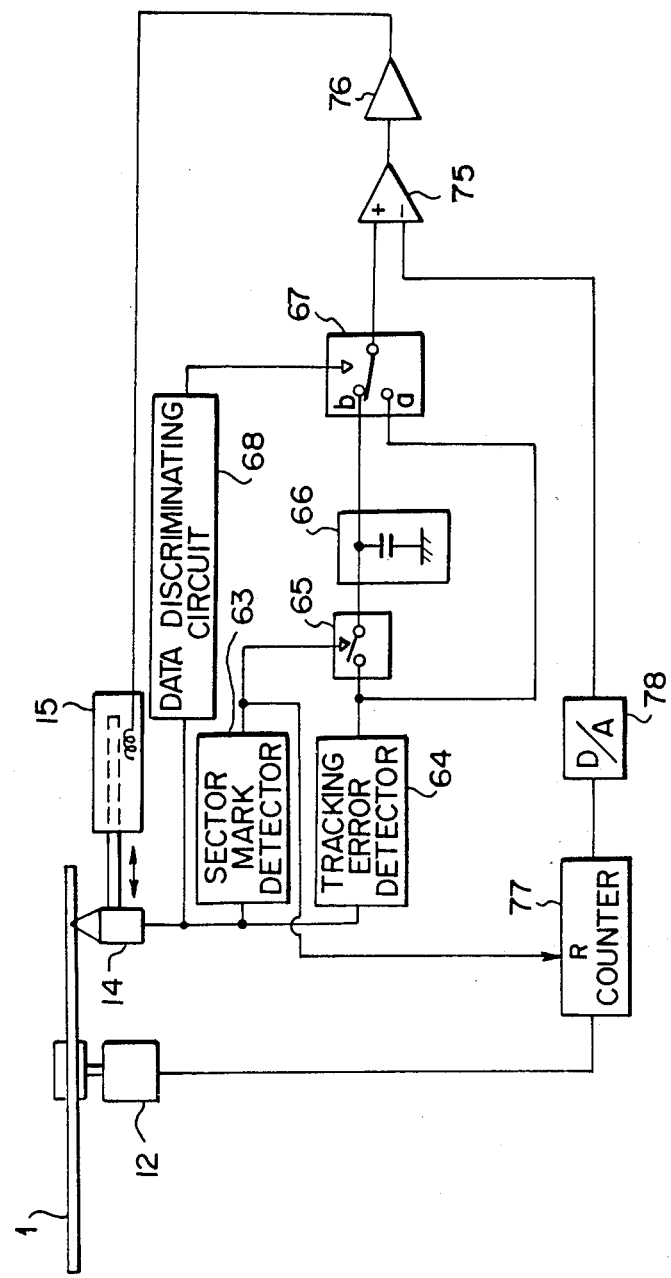
F I G. 15

OPTICAL MEMORY DISK AND TRACK ACCESS THEREFOR

BACKGROUND OF THE INVENTION

1. Field of the Invention The present invention relates to an optical memory disk for storing data along tracks at a high packing density, and indicia-controlled access to desired tracks for recording or reproducing data on and from the optical memory disk.

2. Description of the Prior Art

Optical memory disks recently available as a new information storage medium are finding rapidly growing use in the fields of digital video and/or audio data storage and mass data storage for use with computers. The optical memory disks are much more advantageous than conventional storage mediums such as magnetic tapes and magnetic disks since they have an extremely large storage capacity, do not suffer wear and have a virtually unlimited service life since the associated recording and reading heads do not contact the disk surface, allow quick random access to stored data, and are inexpensive per bit.

Where an optical memory disk is used as a mass storage medium in combination with a computer, a desired track on the disk should be reached by a reading head at a high speed, and transition from a track seeking mode to a tracking mode should quickly and stably be effected because highly frequent random access to data is desired. Tracking of the optical memory disk has been performed by detecting a light beam reflected from or transmitted through the disk and then driving a reading head based on a signal derived from the detected light beam. Most optical memory disks now available have tracking guide grooves. More specifically, a reflected light beam modulated by tracking guide grooves is focused on the light detecting surfaces of a plurality of photodiodes. The photodiodes produce output signals, the difference among which is employed to produce a tracking error voltage for controlling the rate of movement of the reading head in the radial direction of the disk.

The tracking guide grooves allow easy tracking in recording or reproducing data on and from the optical memory disk. However, a complex process is required to fabricate optical memory disks with tracking guide grooves and the fabricated optical memory disks are expensive. As the optical memory disks with tracking guide grooves are complex in structure, they are very apt to be defective, and hence errors occur at a high rate in recording and reproducing data signals on and from the disks. When tracking guide grooves are formed on the optical memory disk in advance, the formats used to record data thereon cannot be selected freely. In particular, where various marks or indicia are allotted in a certain format to an optical memory disk with tracking guide grooves, signals cannot be recorded on the optical memory disk in other formats than the format already adopted.

Some other optical memory disks contain series of track identification marks arranged linearly on radial lines over the disk surface. For access to a target track, the optical reading head is moved from a present track position to a track position in the vicinity of the target track. Then, the information represented by the track identification mark of the track reached by the reading head is read thereby. If the track is not the target track, then the reading head is moved again toward the target track to read another track identification mark. Such a process is repeated until the reading head arrives at the target track. Stated otherwise, the position of the reading head has to be repeatedly corrected by reading identification marks several times until the target track is reached. In addition, it is time-consuming for the reading head to read a track identification mark and determine whether it is the track identification mark of the desired track. Moreover, several track identification marks are required to be checked in view of possible errors present in some track identification marks. Therefore, it takes a relatively long time to gain access to a desired track on the optical memory disk with track identification marks.

For recording data on an optical memory disk having no tracking guide grooves, it has been customary to control an optical recording head, with an external control circuit, to form data storing tracks on the disk surface. One problem with such a data recording process it that the formed tracks tend to be positionally irregular in the radial direction of the disk. With the data tracks unevenly positioned, they cannot accurately be followed by the optical reading head, resulting in tracking errors and making the data retrieval unstable and unreliable.

SUMMARY OF THE INVENTION

In view of the aforesaid drawbacks of the conventional optical memory disks, it is an object of the present invention to provide an optical memory disk having sector marks or indicia arranged on data tracks in angularly different positions for rapid and reliable access to a target data track.

Another object of the present invention is to provide a method of rapidly and reliably accessing a target track on an optical memory disk with an optical head.

Still another object of the present invention is to provide a system for rapidly and reliably accessing a target track on an optical memory disk with an optical head.

A further object of the present invention is to provide a tracking servo method for accurately tracking the desired data track on an optical memory disk with an optical head.

According to the present invention, there is provided an optical memory disk including a plain circular support base, and a recording layer disposed on one surface of the support base and having a plurality of radially spaced data tracks for storing data items therein and further including an original reference mark and angle reference marks which are spaced at equal angular intervals along the outer circumferential edge of said support base, the data tracks being grouped into a number of data track groups, each of the tracks being divided into a plurality of angularly consecutive sectors bearing a plurality of angularly equally spaced sector marks, respectively, the sector marks on the tracks of each of the data track groups being located in angularly different positions, respectively, the sector marks on the outermost data track in each of said data track groups being radially aligned with said original and angle reference marks.

According to the present invention, there is also provided a method of accessing, with an optical head, a target data track on an optical memory disk having a plurality of radially spaced data tracks grouped into a number of data track groups, and further including an original reference mark and angle reference marks which are spaced at equal angular intervals along the outer circumferential edge of said support base, each of the tracks being divided into a plurality of angularly consecutive sectors bearing a plurality of angularly equally spaced sector marks located in angularly different positions in each of the track groups, the sector marks on the outermost data track in each of said data track groups being radially aligned with said original and angle reference marks, the method comprising the steps of moving the optical head in a coarse track seek mode to a track position in the vicinity of the target data track in one of the data track groups, and moving the optical head in a fine track seek mode to the target data track by detecting the sector mark on the target data track which is angularly positioned differently from the other sector marks in the one data track group.

According to the present invention, there is also provided a tracking servo method for accurately tracking the desired data track on an optical memory disk with an optical head having no track guiding structure but having concentrically arranged data tracks provided with characterized in that the tracking control is conducted based on signal obtained by summing an optical head position signal corresponding to the position of the desired track, an eccentricity correction signal and a tracking error signal obtained when the sector mark is detected.

According to the present invention, there is also provided a system for accessing, with an optical head, a target data track on an optical memory disk having a plurality of radially spaced data tracks grouped into a number of data track groups and further including an original reference mark and angle reference marks which are spaced at equal angular intervals along the outer circumferential edge of said support base, each of the tracks being divided into a plurality of angularly consecutive sectors bearing a plurality of angularly equally spaced sector marks located in angularly different positions in each of the track groups, the sector marks on the outermost data track in each of said data track groups being radially aligned with said original and angle reference marks, the system comprising a first means for moving the optical head in a coarse track seek mode to a track position in the vicinity of the target data track in one of the data track groups, and a second means for moving the optical head in a fine track seek mode to the target data track by detecting the sector mark on the target data track which is angularly positioned differently from the other sector marks in the one data track group.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a block diagram of a system for controlling the position of an optical head with respect to an optical memory disk based on sector marks thereon;

FIG. 12 is a diagram showing the manner in which the optical head is controlled;

FIGS. 13 through 15 are block diagrams of optical head control systems according to other embodiments of the present invention;

DESCRIPTION OF THE PREFERRED EMBODIMENTS

Figure 1:
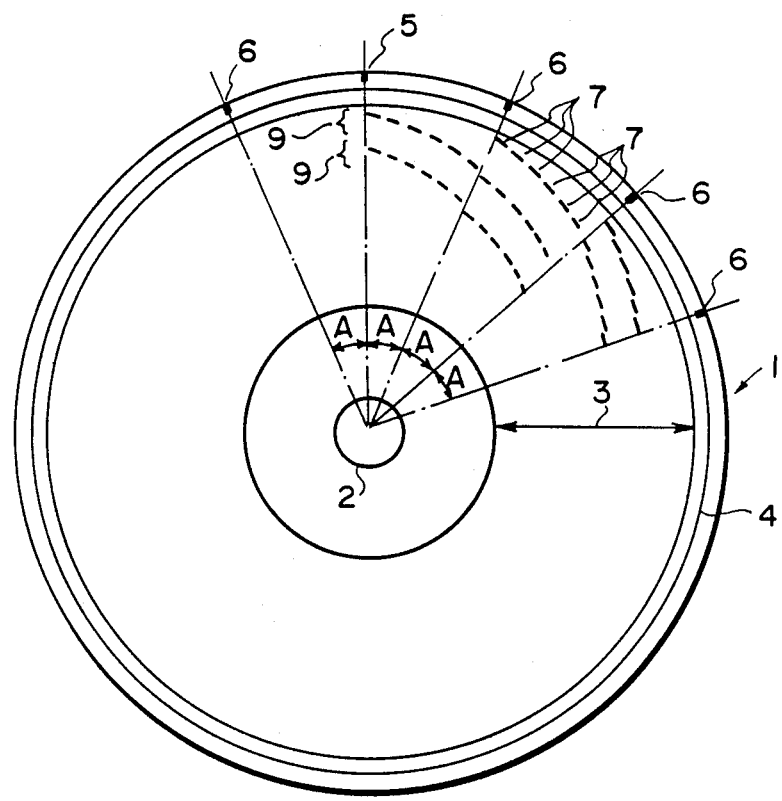
FIG. 1 is a plan view of an optical memory disk according to the present invention, showing the format or organization of sector marks and other marks.

FIGS. 1 through 4 show an optical memory disk 1 according to the present invention. The optical memory disk 1 having a central circular hole 2 is composed of a transparent or opaque circular support base coated on one surface thereof with a recording layer in the form of a thin metal film, for example. The recording layer can be melted or otherwise deformed by exposure to a focused laser beam to form depressions called pits that are optically detectable. As is well known in the art, the recording layer may be made of various materials other than thin metal film, and the optical memory disk may be of various other structures.

The optical memory disk 1 has an annular data storage region 3 extending over part of the recording layer. The data storage region 3 contains a multiplicity (for example, 25,000) data tracks 8 (FIG. 2) which may be circular, as shown, and individually concentric with the central circular hole 2 or may be continuously spiral. Each of the data tracks 8 is composed of a multiplicity of pits (not shown) representative of stored data. A circular reference track 4 lies radially outwardly of the data storage region 3 in concentric relation thereto. The reference track 4 is composed of a series of pits and serves to enable an optical reading head to detect any eccentricity of the optical memory disk 1 when it is loaded into an optical reading device (not shown). The optical memory disk 1 also has a starting reference mark 5 and a plurality (for example, 63) of angle reference marks , the marks 5, 6 being equally angularly spaced at angular intervals A along the outer circumferential edge of the disk 1. The marks 5, 6 can be detected by a reference mark position detector in the form of a photoelectric transducer, for example, when the optical memory disk 1 is rotated, and signals from the reference mark position sensor are used to determine angular positions of the optical memory disk 1. The marks 5, 6 may be of any desired shape insofar as they can produce different signals.

Figure 2:
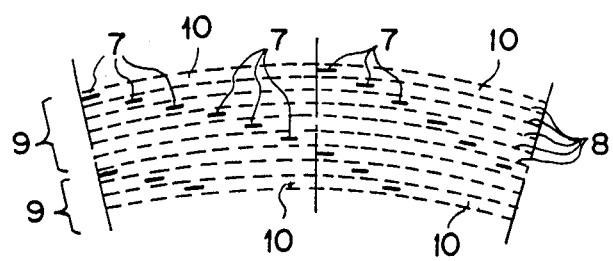
FIGS. 2, 3 and 4 are enlarged fragmentary plan views of the optical memory disk, illustrating data tracks and sector marks.

The data tracks 8 are divided into a number of data track groups 9 in each of which the data tracks 8 are radially consecutive. In FIG. 2, six data tracks 8 are shown in each data track group 9. However, each of the data track groups 9 may preferably be composed of sixteen successive data tracks 8, for example. Each of the data tracks 8 is divided into a plurality of angularly consecutive sectors 10 each subtending the angle A at the center of the optical memory disk 1. The sectors 10 respectively contain sector marks or indicia 7 positioned for indicating the leading ends of the sectors 10. As better shown in FIG. 2, the sector marks 7 are located in the respective sectors 10 at angularly equally spaced intervals in each of the data tracks 8 which are shown as being bounded by dotted lines. The disk 1 has no tracking guide groove between any adjacent sector marks 7 in any data track 8. The sector marks 7 in the adjacent data tracks 8 in each data track group 9 are angularly displaced successively by a certain angle B (FIG. 4) in a spiral pattern. The spiral pattern of the angularly displaced sector marks 7 is repeated in the circumferential direction as many times as the number of the angular intervals A in each data track group 9. The outermost data track 8 in each data track group 9 contains sector marks 7 with their leading ends positioned in alignment with the radial lines passing through the marks 5, 6.

Figure 3:
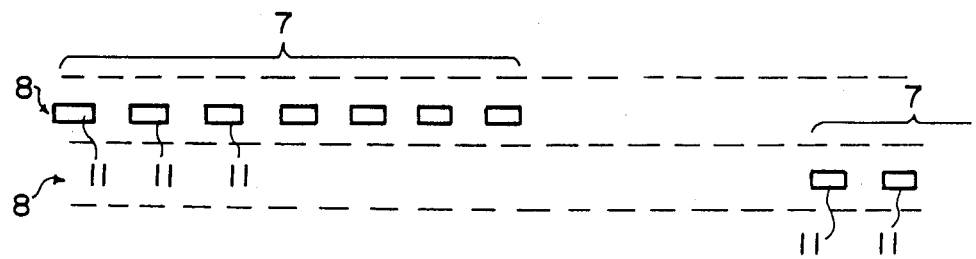
Figure 4:
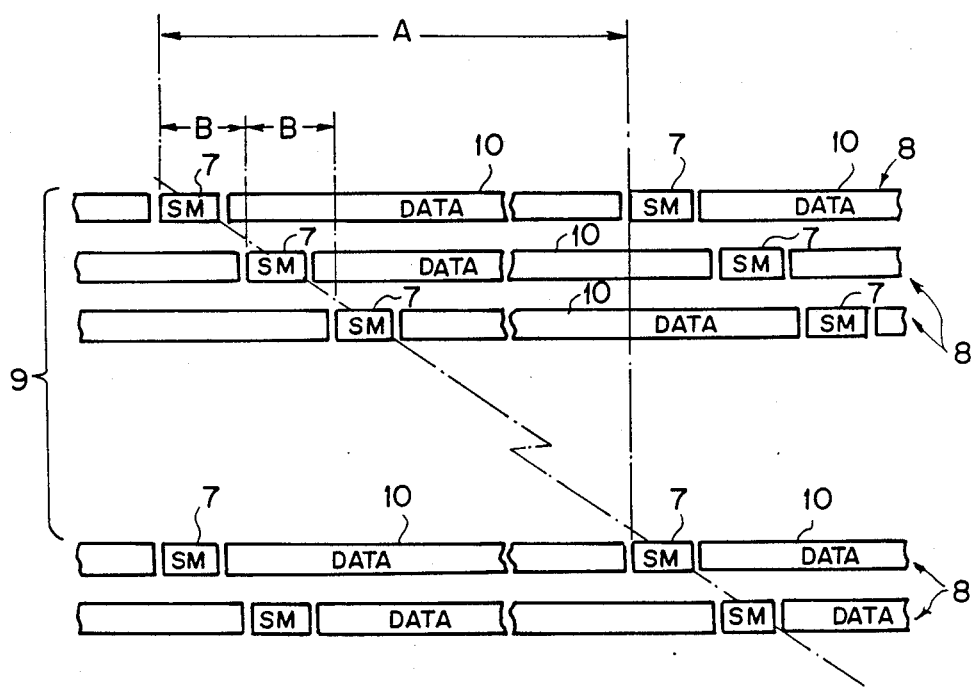

As illustrated in FIG. 3, each sector mark 7 is composed of an array of equally spaced pits 11. The sector mark pits 11 are different in shape from the data pits in the sectors 10 in data tracks 8, and are mutually spaced by intervals which are different from those between the data pits, so that the sector mark pits 11 can produce a signal different from the signals generated by the data pits. For example, where the length of each data pit and the distance between adjacent data pits are in the range of from 1 micron to 2 microns, the length of each sector mark pit 11 and the distance between adjacent sector mark pits may be about 4 microns. Each sector mark 7 may comprise twelve pits, for example.

All of the sector marks 7 are identical indicia representative of the leading ends of the respective sectors 10, but are not required to contain any information indicating track addresses and sector addresses.

Any sector 10 on the optical memory disk 1 can be accessed reliably by an optical reading or recording head movable radially across the optical memory disk 1 in combination with the reference mark position sensor for detecting the marks 5, 6 and a head position sensor for detecting the position of the optical head radially with respect to the optical memory disk 1. More specifically, the track group 9 in which the optical head is positioned can be determined by the head position sensor. The track 8 accessed by the optical head in a particular track group 9 can be detected by determining the angular interval between the reference position indicated by the mark 5 or 6, i.e., the sector mark 7 on the outermost track 8, and the sector mark 7 detected by the optical head, since each sector mark 7 in each track group 9 is associated with one data track 8 through its own inherent angular displacement from the reference position. The sector 10 to be reached by the optical head in the accessed data track 8 can be determined by the signal generated by the mark position sensor because the angular position of each sector 10 in a particular data track 8 with respect to the original reference position indicated by the mark 5 can be identified by the associated mark 5 or 6.

Figure 5:
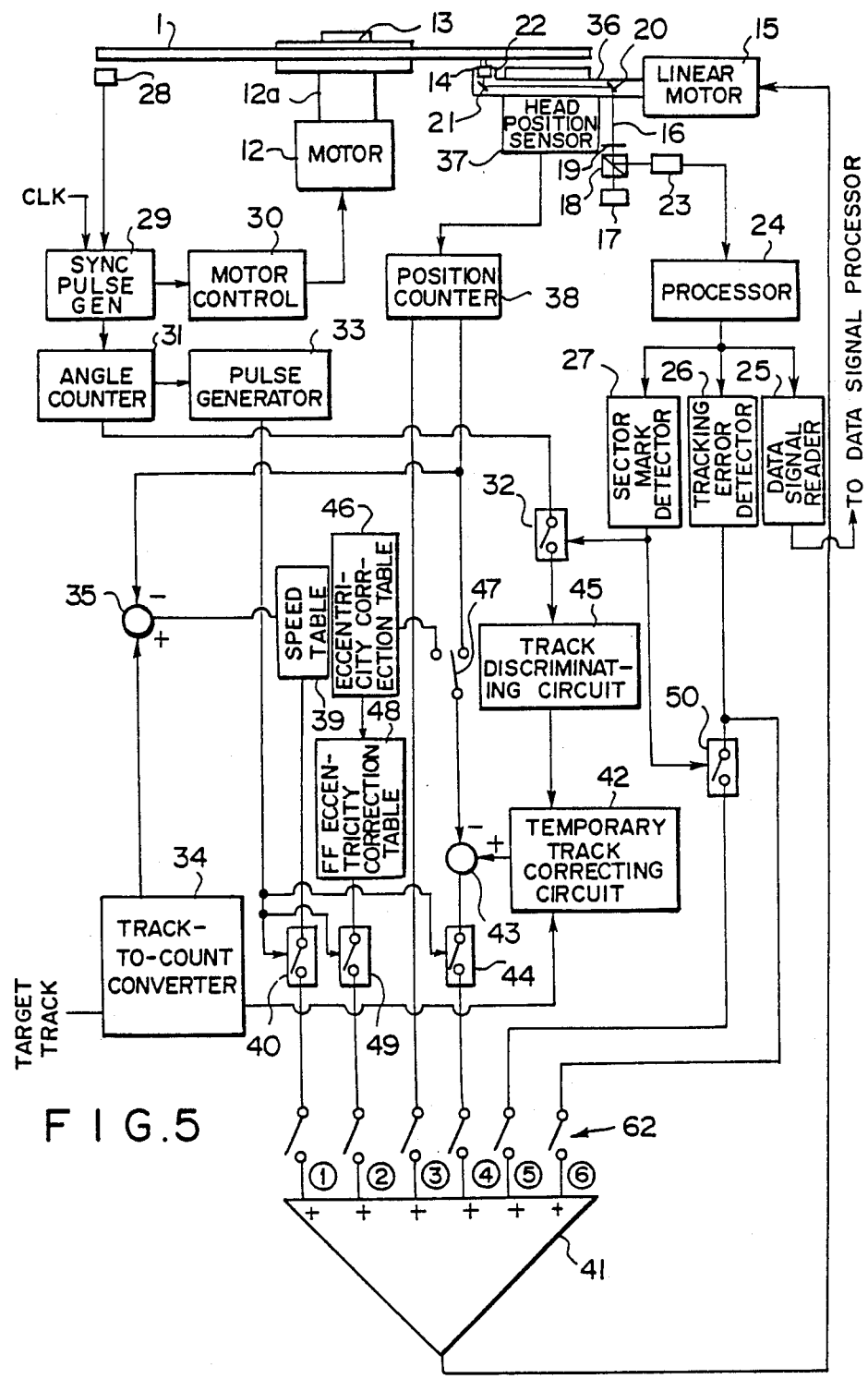
FIG. 5 is a block diagram of a system for controlling the position of an optical head with respect to an optical memory disk.
Figure 6:
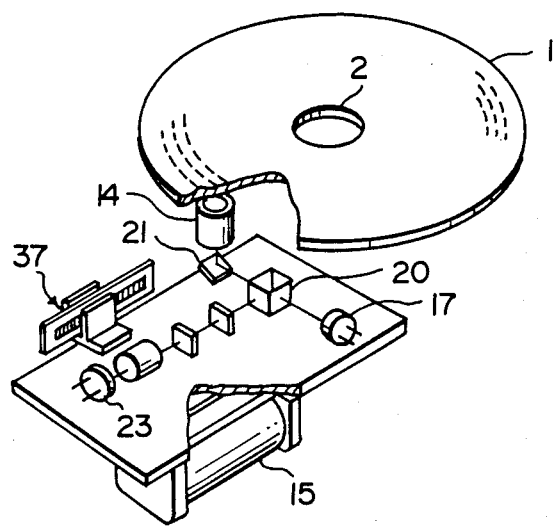
FIG. 6 is a perspective view, partly cut away, of a data reading unit for use with the optical memory disk of the present invention.

FIG. 5 shows a block form a system for effecting a tracking servo process for controlling the position of an optical reading or recording head with respect to the optical memory disk to gain access to a desired data track on the optical memory disk. The optical memory disk 1 loaded in an optical disk recording and reading apparatus is attached by an attachment 13 to the spindle 12a of a motor 12, which is inserted in the central hole 2 in the disk 1. The disk 1 is driven by the motor 12 to rotate at a constant speed of about 450 r.p.m. An optical reading or recording head 14 is disposed below the disk 1 in confronting relation to the recording layer thereof for reading stored data from or recording data on the data tracks of the disk 1. The optical head 14 is supported on the arm 36 of a linear motor 15 and movable thereby in the radial direction of the disk 1. A laser beam 16 generated by a semiconductor laser 17 is passed through a lens system (shown in FIG. 6) and then through a polarizing beam splitter 18 and a quarter-wave plate 19. The laser beam 16 is reflected by mirrors 20, 21 while traveling through the linear motor arm 36, and is radiated through an objective lens 22 onto the disk 1 with a beam spot having a diameter of about 1 micron. The laser beam reflected from the disk 1 travels back through the objective lens 22, the mirrors 21, 20, and the quarter-wave plate 19, and is reflected by the beam splitter 18 toward a photodetector device 23 which produces signals dependent on the pits recorded on the disk 1. The signals from the photodetector device 23 are delivered to a processor 24 from which the processed signals are applied to a data signal reader 25, a tracking error detector 26, and a sector mark detector 27. The data signal from the data signal reader 25 is issued to a data signal processor (not shown) for reproducing desired data. The tracking error signal produced by the tracking error detector 26 is applied to a sample-and-hold circuit 50 and an adder amplifier 41. The sector mark signal from the sector mark detector 27 is supplied as sample-and-hold signals to the sample-and-hold circuit 50 and another sample-and-hold circuit 32.

A reference mark position sensor 28 is positioned beneath the outer circumferential edge of the disk 1 for detecting the original and angle reference marks 5, 6 to issue reference pulses to a synchronous pulse generator 29. Since the marks 5, 6 total 64, the reference mark position sensor 28 produces 64 pulses per revolution of the disk 1. The synchronous pulse generator 29 comprises a phase-locked loop circuit for synchronizing the reference pulses in response to a reference clock signal applied thereto. The pulse signal from the synchronous pulse generator 29 is fed to a motor control circuit 30 and an angle counter 31. The motor control circuit 30 controls the motor 12 to rotate at a constant speed based on the supplied pulses. The angle counter 31 counts the supplied pulses and delivers them to the sample-and-hold circuit 32 and a pulse generator 33. The pulse generator 33 generates 256 pulses per revolution of the disk 1 in response to the pulses fed from the angle counter 31, and applies the generated pulses as a sample-and-hold signal to sample-and-hold circuits 40, 44 and 49. Where each of the data track groups 9 is composed of sixteen data tracks 8, there are 1,024 (16×64) sector marks or sector mark positions (angularly displaced as seen from the center of the disk 1) per track group since there are 64 sectors in each track group 9.

Access to a desired track by the optical head 14 is achieved by a coarse track seek or access mode and a fine track seek or access mode. In the coarse track seek mode, the optical head 14 is moved at a high speed to a position near a target data track. In the fine track seek mode, the optical head 14 in the vicinity of the target data track is moved accurately to the target track.

First, the coarse track seek mode will be described below. The present position of the optical head 14 with respect to the disk 1 is detected by a head position sensor 37 (FIGS. 5 and 6) which detects the interval of movement of the linear motor arm 36 on which the optical head 14 is mounted. The position signal from the head position sensor is applied to a position counter 38 which counts the applied signal and stores the count. When a signal indicative of a desired target track is applied to a track-to-count converter 34, the track-to-count converter 34 generates a position count and applies the same to a subtractor 35. Since the count from the position counter 38 is applied to the subtractor 35, the subtractor 35 generates a position count which is the difference between the target track position and the present position of the optical head 14 and applies the position count to a speed table 39. The speed table 39 generates a signal indicative of the interval of movement commensurate with the difference between the target track position and the present position of the optical head 14. The signal generated by the speed table 39 contains information for controlling the linear motor 15 to reduce the speed of travel of the optical head 14 as it approaches the target track for thereby preventing the optical head 14 from overshooting the target track. The signal from the speed table 39 is applied to the sample-and-hold circuit 40, and sampled by the pulses from the pulse generator 33 and applied as an arm drive signal (1) to the adder amplifier 41. The adder amplifier 41 applies its output signal to the linear motor 15 to move the arm 36 in the direction so as to move the optical head 14 quickly toward the target track. The distance which the optical head 14 has traversed is detected by the head position sensor 37 and the position counter 38 issues a corresponding count to the subtractor 35 which then produces a reduced position count. The optical head 14 is thus moved toward the target track position. While the distance between the present head position and the target track position is relatively large, the optical head 14 is moved at a higher speed. As the distance decreases, the optical head 14 is moved at a lower speed.

When the position count from the subtractor 35 indicates that the optical head 14 has substantially reached the target track, the coarse track seek mode based on the signal (1) from the sample-and-hold circuit 40 is brought to an end.

To avoid an undesired delay in the movement of the optical head 14, the position counter 38 produces a counter error signal (3) indicative of an error dependent on such a movement delay and applies the counter error signal (3) directly to the adder amplifier 41 which then drives the linear motor 15 to eliminate the delay. The counter error signal (3) is proportional to the speed of movement of the optical head 14 and can be produced by differentiating the count of the position counter 38.

The head position sensor 37 may comprise a linear encoder. It should have such accuracy as to be able to detect about half of the radial width of one data track group. Where there are sixteen tracks spaced at intervals of 2 microns in one data track group, the head position sensor 37 should be of an accuracy capable of detecting a width of about 10 microns.

Figure 7:
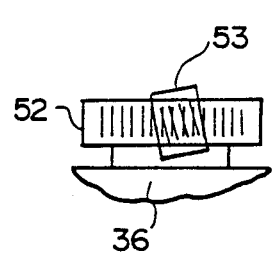
FIG. 7 is a side elevational view of gratings of the data reading unit.
Figure 8:
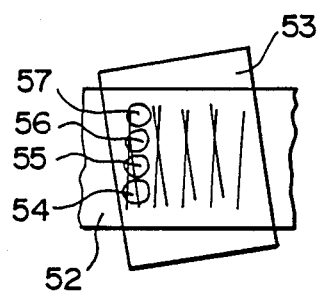
FIG. 8 is an enlarged side elevational view of the gratings and associated photodetectors.
Figure 9A:
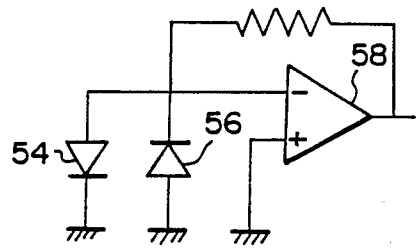
FIGS. 9A and 9B are circuit diagrams of the photodetectors and differential amplifiers connected thereto.
Figure 10A:
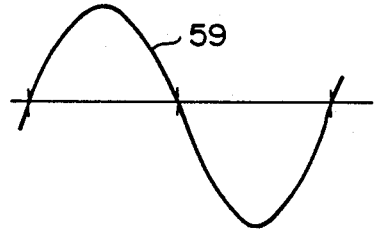
FIGS. 10A and 10B are diagrams of the waveforms of signals produced by the differential amplifiers shown in FIGS. 9A and 9B.
Figure 9B:
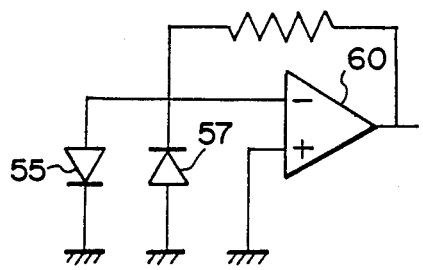
Figure 10B:
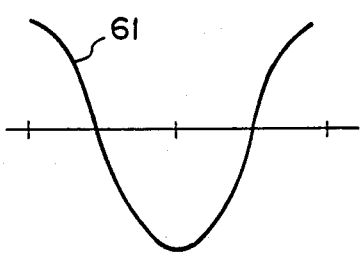

The head position sensor 37 and the position counter 38 which are of a high degree of accuracy will be described below. As shown in FIGS. 7 and 8, a first elongate grating 52 is mounted on the linear motor arm 36, the first grating 52 having fine wires disposed at spaced intervals of 128 microns, for example. The head position sensor 37 includes a second grating 53 secured to a fixed member (not shown) adjacent to the first grating 52. The second grating 53 also has fine wires spaced at intervals of 128 microns and is slightly inclined with respect to the first grating 52. The first and second gratings 52, 53 form a moire pattern the intervals of which are selected dependent on the desired accuracy for the head position sensor 37. The head position sensor 37 also includes a light source (not shown) disposed on one side of the first and second gratings 52, 53 and a photodetector positioned on the other side of the first and second gratings 52, 53 and composed of four photodetectors 54, 55, 56, 57 arranged at equal intervals in an array normal to the direction of travel of the first grating 52. As the optical head 14 moves radially of the disk 1, the first grating 52 moves with respect to the second grating 53, thus moving the moire pattern. In response to light rays emitted by the light source and passed through the first and second gratings 52, 53, the photodetectors 54 through 57 issue varying output signals. The photodetectors 54, 56 are connected as shown in FIG. 9A to a differential amplifier 58 which produces a sine wave signal 59 as shown in FIG. 10A. The photodetectors 55, 57 are connected as shown in FIG. 9B to a differential amplifier 60 which produces a sine wave signal 61 as shown in FIG. 10B. The signals 59, 61 are 90° out of phase with each other. After the signals 59, 61 have been adjusted in amplitude and phase, they are applied as sin x and cos x to the position counter 38 periodically each time the optical head 14 moves the distance of 128 microns. When the target track data is entered, the position counter 38 converts the position in the position sensor which corresponds to that track, and issues signals of sin y and cos y according to the phase y of the position from a table. The position counter 38 then applies these signals to a circuit therein for computing sin x cos y−cos x sin y=sin (x−y). The value x is selected so that sin (x−y)=0. The selected value x has an accuracy with which to divide 360° by 4,096, and hence the head position sensor 37 has an accuracy with which to divide the grating interval of 128 microns, or an accuracy of 0.032 microns. Where the data tracks are spaced at intervals of 2 microns and one data track contains sixteen track group with the grating interval of the head position sensor being 128 microns, the grating interval is large enough to cover 64 tracks or 4 track groups. However, since the head position sensor is highly accurate as described above, the optical head 14 can be moved into a position close to the target track in the coarse track seek mode.

The fine track seek mode will now be described. With the optical head 14 moved to a track in the vicinity of the target track in the coarse track seek mode, the target track can be detected among several data tracks based on the angular position of the sector mark on the target track in the fine track seek mode. When the target track data is applied to the track-to-count converter 34, it applies the target track position count to a temporary target track correcting circuit 42 which initially feeds the target track position count to a subtractor 43. The subtractor 43 subtracts the present position count of the position counter 38 from the target track position count. The output signal from the subtractor 43 is sampled by the sample-and-hold circuit 44 in response to the pulses from the pulse generator 33, and is applied as an arm movement adjusting signal (4) to the adder amplifier 41. The arm movement adjusting signal representing an interval of movement across several data tracks is then delivered from the adder amplifier 41 to the linear motor 15 which is energized to move the optical head 14 toward the target track.

The present track data is detected from the disk 1 in the following manner: The binary code signal from the angle counter 31 is applied to the sample-and-hold circuit 32, and sampled and held by a sector mark detecting signal from the sector mark detector 27. Therefore, the angle count at the time the sector mark 7 is detected is held in the sample-and-hold circuit 32. The output signal from the sample-and-hold circuit 32 is commensurate with the angular interval from the reference mark position on the disk 1, and is applied to a track discriminating circuit 45 which discriminates the track which is now accessed by the optical head 14. The track discriminating circuit 45 issues a signal indicative of the presently accessed track to the temporary target track correcting circuit 42. If there is an error between the present track signal and the target track signal, then the temporary target track correcting circuit 42 corrects the target track signal and issues the corrected position count to the subtractor 43 so that the present track signal discriminated by the track discriminating circuit 45 will be brought into conformity with the target track signal. The subtractor 43 applies its output signal to the sample-and-hold circuit 44 which in turn delivers the same as an arm movement adjusting signal to the adder amplifier 41. The adder amplifier 41 feeds this adjusting signal to the linear motor 15 for thereby moving the optical head 14. Each time a pulse from the angle counter 31 is sampled by the sample-and-hold circuit 32, the above process is repeated until the optical head 14 reaches the target track, whereupon the fine track seek mode is completed.

Even after the target track is detected by the optical head, the track is continuously discriminated to generate the signal (4) as an arm position keeping signal for keeping the optical head from being displaced from the target track.

Although each sector mark has been described as containing no track address and no sector address, it may contain a track address and a sector address which may be detected by the optical head for more reliable access to a desired track and a desired sector.

Eccentricity correction during the fine track seek mode will hereinafter be described. When the optical memory disk 1 is loaded, the reference track 4 is followed by the optical head 14, and the difference between the position count of a concentric circle to be represented by the reference track 4 and the position count of the reference track actually followed by the optical head 14 is sampled at 256 points per revolution of the disk 1 and stored as an eccentricity value in an eccentricity correction table 46. At this time, the signal produced by the tracking error detector 26 is used as a tracking error signal (6). The eccentricity value from the table 46 is applied to a changeover switch 47 and added to the position count from the position counter 38, the sum being fed to the substractor 43. Therefore, even if the position count varies in one revolution of the disk 1 due to disk eccentricity, such a position count variation can be canceled out by causing the optical head 14 to follow the eccentric reference track 4, and the position count with the track eccentricity corrected is applied to the subtractor 43. The changeover switch 47 is normally set to issue the eccentricity-corrected position count to the subtractor 43.

The track eccentricity value from the eccentricity correction table 46 is used to derive a feed-forward eccentricity correction value which is delivered to a feed-forward eccentricity correction table 48. The feed-forward eccentricity correction value serves to correct any track eccentricity at a present angular position before the angular position of the disk 1 which is presently detected. The feed-forward eccentricity correction value is given in advance to compensate for a response delay of the linear motor 15 with respect to the rotation of the disk 1. The feed-forward eccentricity correction value is proportional to the actual track eccentricity and is given a few sampling points in advance dependent on the response characteristics of the linear motor 15.

The correction value from the feed-forward eccentricity correction table 48 is sampled by the sample-and-hold circuit 49 in response to the pulses from the pulse generator 33, and is delivered as a signal (2) to the adder amplifier 41. The signal (2) is then applied to the linear motor 15. The accuracy of the fine track seek mode is thereby increased.

The width of each track group should preferably be selected to be larger than the possible eccentricity of the disk 1 to prevent the optical head 14 from being moved to a data track which is excessively widely spaced from the target track, i.e., to allow the optical head 14 to access the target track in a short period of time.

A tracking servo process will be described below. In the tracking servo process, the optical head 14 is controlled to accurately follow or track the desired data track which has been reached by the optical head in the coarse and fine track seek modes. If the laser beam emitted from the optical head 14 deviates from the center of the data track provided with pits, the deviation of the optical head 14 in the radial direction of the disk 1 is detected by the tracking error detector 26 based on the distribution of the laser beam reflected from the disk 1. The tracking error detector 26 may be of any conventional design. The tracking error signal is produced not only from the sector marks, but also from the data track between the sector marks. To pick up the tracking error signal derived from the sector marks only, the tracking error signal from the tracking error detector 26 is sampled by the sample-and-hold circuit 50 in response to the sector mark detecting signal from the sector mark detector 27, and is held by the sample-and-hold circuit 50 until the tracking error signal is sampled at the next time. The tracking error signal from the sample-and-hold circuit 50 is applied as the signal (5) to the adder amplifier 41. The tracking error signal (5) serves to control the linear motor 15 for keeping the optical head 14 in a fixed position from one sector mark 7 to the following sector mark 7. The tracking error signal is temporarily used in the eccentricity correction during the fine track seek mode, but is not employed in the coarse and fine track seek modes themselves.

The tracking error signal (5) and the arm position keeping signal (4) corrected by the eccentricity correction value from the table 46 are added by the adder amplifier 41 and issued therefrom as a tracking control signal for controlling the linear motor 15 to move the optical head 14 in the radial direction of the disk 1 to enable the laser beam to follow the desired data track. The arm position keeping signal (4) serves to detect whether the arm position corresponds to the target track and to keep the optical head 14 positioned with respect to the target track at all times. The tracking error signal (5) serves to move the optical head 14 slightly for preventing the same from being displaced from the track which is presently accessed. Therefore, the tracking control signal is effective to enable the optical head 14 to follow the target track at all times.

More accurate tracking can be effected by adding the feed-forward eccentricity correction signal (2) to the tracking control signal. When the feed-forward eccentricity correction signal (2) is employed, a relatively heavy optical head or a drive system such as a linear motor having a relatively slow response can be used in combination with the optical disk which rotates at a high speed.

The various signals applied to the adder amplifier 41 for the control of the linear motor 15 are tabulated as follows:

| | | Mode | | | |
|---|---|---|---|---|---|
| No | Signal | Eccentricity detection | Coarse seek | Fine seek | Tracking servo |
| (1) | Arm drive | | * | | |
| (2) | Feed-forward eccentricity correction | | | * | * |
| (3) | Counter error | | * | | |
| (4) | Arm movement adjusting with eccentricity correction or arm position keeping with eccentricity correction | | | * | * |
| (5) | Tracking error held by sector mark detecting signal | | | | * |
| (6) | Tracking error | * | | | |

The mark * indicates the mode in which the signal is used.

The input terminals of the adder amplifier 41 are connected to a switch array 62 which can be operated by a mode sequencer for sequentially selecting the modes given in the above table. The adder amplifier 41 issues the selected signal to the linear motor 15 in the respective mode.

FIG. 11 shows a tracking servo system for controlling the position of the optical recording or reading head 14 with respect to the optical memory disk 1 during the tracking mode. A sector mark detector 63 is connected to the optical head 14 for issuing a sector mark signal when it detects a sector mark. A tracking error detector 64 is also connected to the optical head 14 for issuing a tracking error signal by detecting any deviation of the laser beam from the desired data track on the disk 1. The tracking error can be detected by any conventional process such as the three-beam process, the push-pull process, or the DPD (Differential Phase Detection) process. The sector mark signal from the sector mark detector 63 is applied to an analog switch 65 to control the transmission of the tracking error signal from the tracking error detector 64. The analog switch 65 is connected to a hold circuit 66 coupled to a tracking servo driver 67 which is connected to the linear motor 15.

In recording data on or reading data from the disk 1 as it rotates, a sector mark is detected by the sector mark detector 63 to close the switch 65. The tracking error of the sector mark is detected by the tracking error detector 64, and the tracking error signal from the tracking error detector 64 is held in the hold circuit 66. After the sector mark has moved past the optical head 14 and hence the switch 65 is turned off, the tracking error signal is stored in the hold circuit 66. The tracking servo driver 66 is responsive to the tracking error signal from the hold circuit 66 for actuating the linear motor (tracking servo actuator) 15 to control the optical head 14 so as to keep it in the proper track position, whereby the tracking error of the sector mark is eliminated.

While the optical head 14 is being kept in the proper track position, data is recorded in the sector or read from the sector by the optical head 14. When the next sector is detected, the switch 65 is turned on again by the sector mark detected 63, and the tracking error of this sector is stored in the hold circuit 66 for enabling the optical head 14 to follow the sector. The above process is repeated to successively record or read the desired data. FIG. 12 shows at (I) the amount of radial movement (shown vertically) of the optical head 14 in tracking successive sectors (shown horizontally).

FIG. 13 shows a tracking servo system according to another embodiment of the invention. Here, the hold circuit 66 is connected to a switch 67 controlled by a data discriminating circuit 68 connected to the optical head 14. The data discriminating circuit 68 serves to detect whether data information is contained in the laser beam reflected from the disk 1. The switch 67 has a contact a connected directly to the tracking error detector 64 and a contact b connected to the hold circuit 66. The switch 67 is connected to a low-pass filter 69 and a high-pass filter 70 which are coupled to drivers 71, 72, respectively. The driver 71 is connected to the linear motor 15 and the driver 72 is connected to a tracking servo actuator 14a in the optical head 14.

In recording data on the disk 1, the tracking error signal from the hold circuit 66 is passed through the switch 67, the low-pass filter 69, and the driver 71 to the linear motor 15 for controlling the optical head 14 in the same mode as that shown in FIG. 11. When reading data from the disk 1, the data discriminating circuit 68 detects data and sets the switch 67 to the contact a. The tracking error signal from the tracking error detector 64 is applied via the switch 67 to the low-pass filter 69 and the high-pass filter 70. The low-pass filter 69 transmits a low-frequency component to the driver 71, and the high-pass filter 70 transmit a high-frequency component to the driver 72. The output signals from the drivers 71, 72 are applied to the linear motor 15 and the tracking servo actuator 14a, respectively. FIG. 12 shows at (II) the combined movement of the optical head 14 actuated by the linear motor 15 and the tracking servo actuator 14a in following successive sectors.

Since the tracking servo system is under closed loop control while the data is being read, accurate tracking is assured even when the optical head 14 is subject to accidental vibration, and reading error is less likely to occur. The response of the tracking servo system is improved as the linear motor 15 and the tracking servo actuator 14a are actuated by low- and high-frequency components, respectively.

Figure 14:
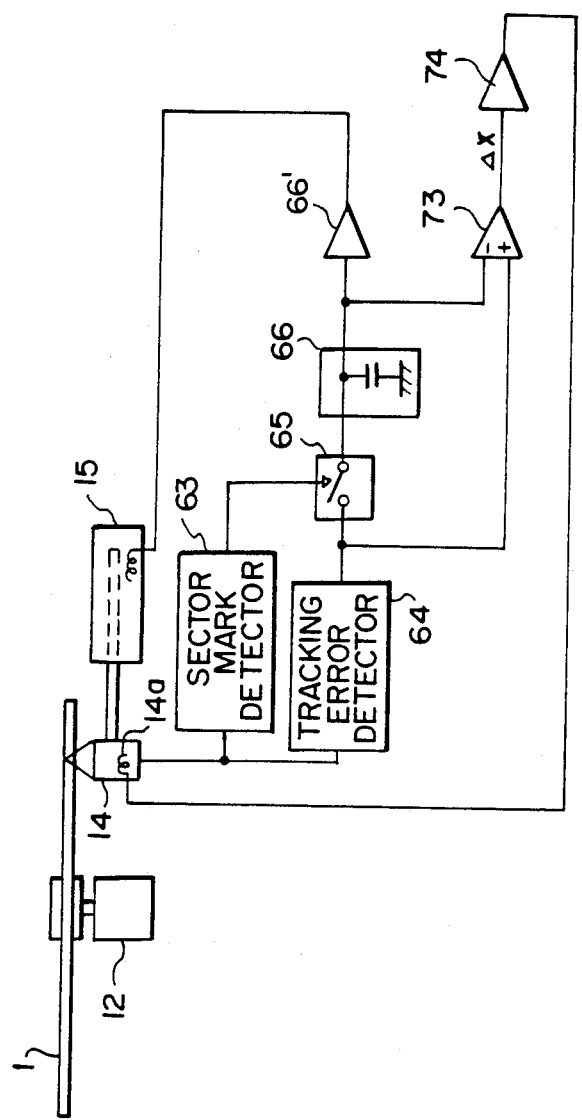

FIG. 14 shows a tracking servo system according to still another embodiment of the present invention. The tracking error signal held in the hold circuit 66 and the tracking error directly from the tracking error detector 64 are applied to the input terminals of a subtractor 73 which is connected to a driver 74 for actuating the tracking servo actuator 14a. The subtractor 73 issues a signal indicative of the deviation of the real-time tracking error of the sector mark from the stored tracking error of the sector mark. The signal from the subtractor 73 is applied via the driver 74 to the tracking servo actuator 14a.

A tracking servo system according to a still further embodiment shown in FIG. 15 is used with an optical disk 1 having a spiral data track bearing a number of spaced sector marks. The illustrated tracking servo system includes an adder 75 connected to the output terminal of the switch 67 and the input terminal of a driver 76 coupled to the linear motor 15. A counter 77 is coupled to the motor 12 for counting pulses indicative of angular positions of the motor 12 or the disk 1, and is also connected to a digital-to-analog converter 78 coupled to the adder 75. The counter 77 can be reset by the sector mark signal from the sector mark detector 63. The digital-to-analog converter 78 issues a signal representative of a tracking correction value which is equal to the radial interval between adjacent track turns per revolution of the disk 1. During data recording mode, the tracking error signal of a sector mark is stored in the hold circuit 66 and applied to the adder 75 through the switch 67. The counter 77 is reset by the sector mark signal from the sector mark detector 63. The angular displacement of the disk 1 starting from the sector mark is counted by the counter 77 which applies a tracking correction signal through the digital-to-analog converter 78 to the adder 75. Therefore, the linear motor 15 is driven by the sum of the tracking error signal and the tracking correction signal so that the optical head 14 can follow the spiral data track. When reading stored data from the disk 1, the real-time tracking error is applied directly from the tracking error detector 64 to the adder 75, which is also supplied with the track correction signal from the digital-to-analog converter 78. Thus, the optical head 14 can also follow the spiral data track in the data reading mode.

Figure 16:
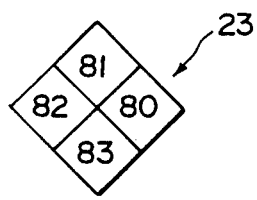
FIG. 16 is a schematic diagram of a focus error detector composed of four photodetectors.
Figure 17A:
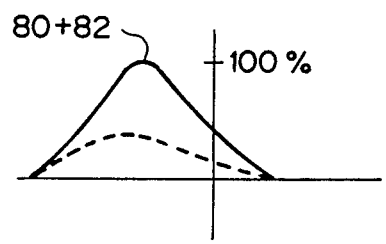
FIGS. 17A and 17B are diagrams showing the waveforms of signals issued by pairs of the photodetectors.
Figure 18:
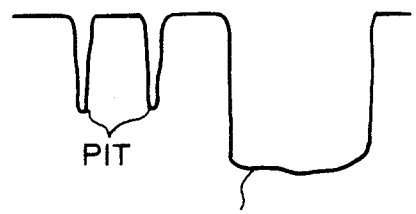
FIG. 18 is a diagram of a signal waveform produced by detecting information-dependent pits and a detect on an optical memory disk.
Figure 17B:
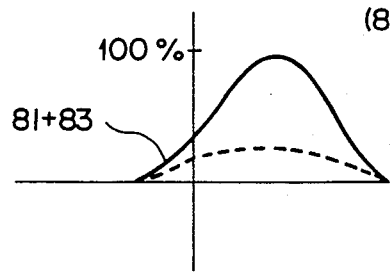
Figure 19:
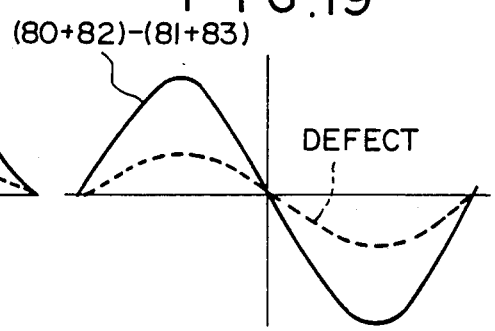
FIG. 19 is a diagram of a waveform which is the difference between the waveforms of FIGS. 17A and 17B.

FIG. 16 shows the photodetector device 23 which comprise a matrix of four photodetectors 80, 81, 82 and 83. The sum (FIG. 17A) of the output signals from the diagonally opposite photodetectors 81, 83 is subtracted from the sum (FIG. 17B) of the output signals from the other diagonally opposite photodetectors 80, 82 to produce a focus error signal as shown in FIG. 19. The recording layer of the optical disk contains some defects where the surface reflectance is much lower than that of the defect-free surface as illustrated in FIG. 18. When the laser beam reflected from such a surface defect is detected by the photodetectors 80 through 83, the combined output signals therefrom have a waveform as indicated by the dotted line in FIG. 19. Therefore, the output from the photodetector device 23 can be utilized to detect such a surface defect or a focus error.

Figure 20:
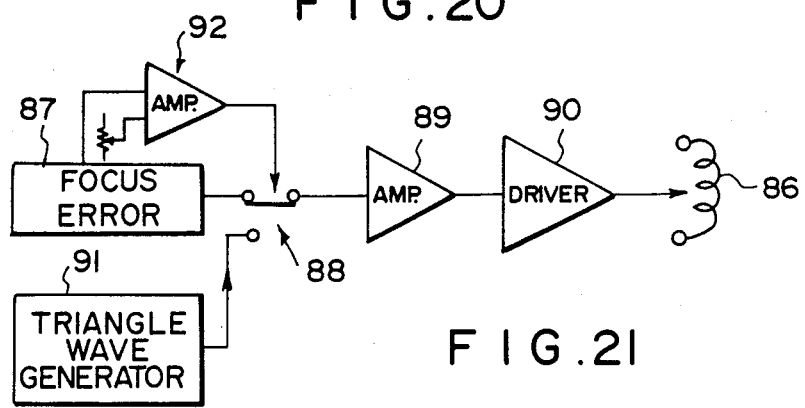
FIG. 20 is a block diagram of a focusing device.
Figure 21:
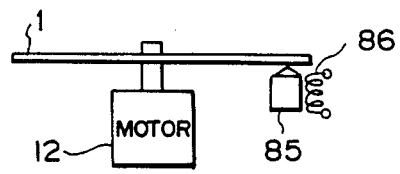
FIG. 21 is a side elevational view of an optical head movable by a focusing coil of the focusing device toward and away from an optical memory disk.

FIGS. 20 and 21 illustrate a focusing device for focusing the laser beam from the optical head onto the optical memory disk. As shown in FIG. 21, the optical head, indicated at 85, is movable toward and away from the disk 1 in the direction normal thereto for focusing the laser beam on the disk 1. The optical head 85 can be driven toward and away from the disk 1 by a focusing coil 86 upon its energization. As illustrated in FIG. 20, a focus error detector 87 is connected via a changeover switch 88, an amplifier 89 and a driver 90 to the focusing coil 86. A triangle wave generator 91 is also connected to the changeover switch 88. The changeover switch 88 is controlled by a focus threshold circuit 92 coupled to the focus error detector 87. When the focus error detected by the focus error detector 87 is larger than a prescribed threshold, the focus threshold circuit 92 is energized to drive the changeover switch 88 to connect the triangle wave generator 91 to the amplifier 89. Therefore, the focusing coil 86 is energized by the output from the triangle wave generator 91 to move the optical head 85 rapidly out of the defocused position into a near-focus position. Once the optical head 85 is moved to the near-focus position, the focus threshold circuit 92 shifts back the changeover switch 88 to connect the focus error detector 87 to the amplifier 89, whereupon the focusing coil 86 is driven by the output of the focus error detector.

The present invention has been described as being applied to an optical memory disk. However, the principles of the invention are also applicable to an optomagnetic data storage medium having a uniformly magnetized recording layer. Data can be recorded on the optomagnetic data storage medium by heating the recording layer with a laser beam up to a temperature higher than the curie point while the recording layer is placed in a magnetic field in a different direction than the direction in which the recording layer is uniformly magnetized, and by magnetizing the point on the recording layer where the laser beam is applied, in the opposite direction.

Although certain preferred embodiments have been shown and described, it should be understood that many changes and modifications may be made therein without departing from the scope of the appended claims.

What is claimed is:

1. A tracking servo method for accurately tracking with an optical head a desired data track on a rotating optical memory disk having no tracking guide grooves but having concentrically arranged data tracks provided with sector marks characterized by the steps of producing an optical head position signal corresponding to the position of the desired track, producing an eccentricity correction signal derived from an eccentricity detected in the rotating disk, producing a tracking error signal obtained when the sector mark is detected, summing said head position signal, said eccentricity correction signal and said tracking error signal, and adjusting the position of said head as a function of the summed signals.

2. A tracking servo method according to claim 1, further comprising the steps of sampling said tracking error signal in response to the detection of each sector mark and holding the sampled tracking error signal until the tracking error signal is next sampled.

* * * * *